3,195,532
MEAL WARMER
Severin T. Tranberg, 130 Westhill Road, Colonia, N.J.
Filed Nov. 18, 1963, Ser. No. 324,336
1 Claim. (Cl. 126—378)

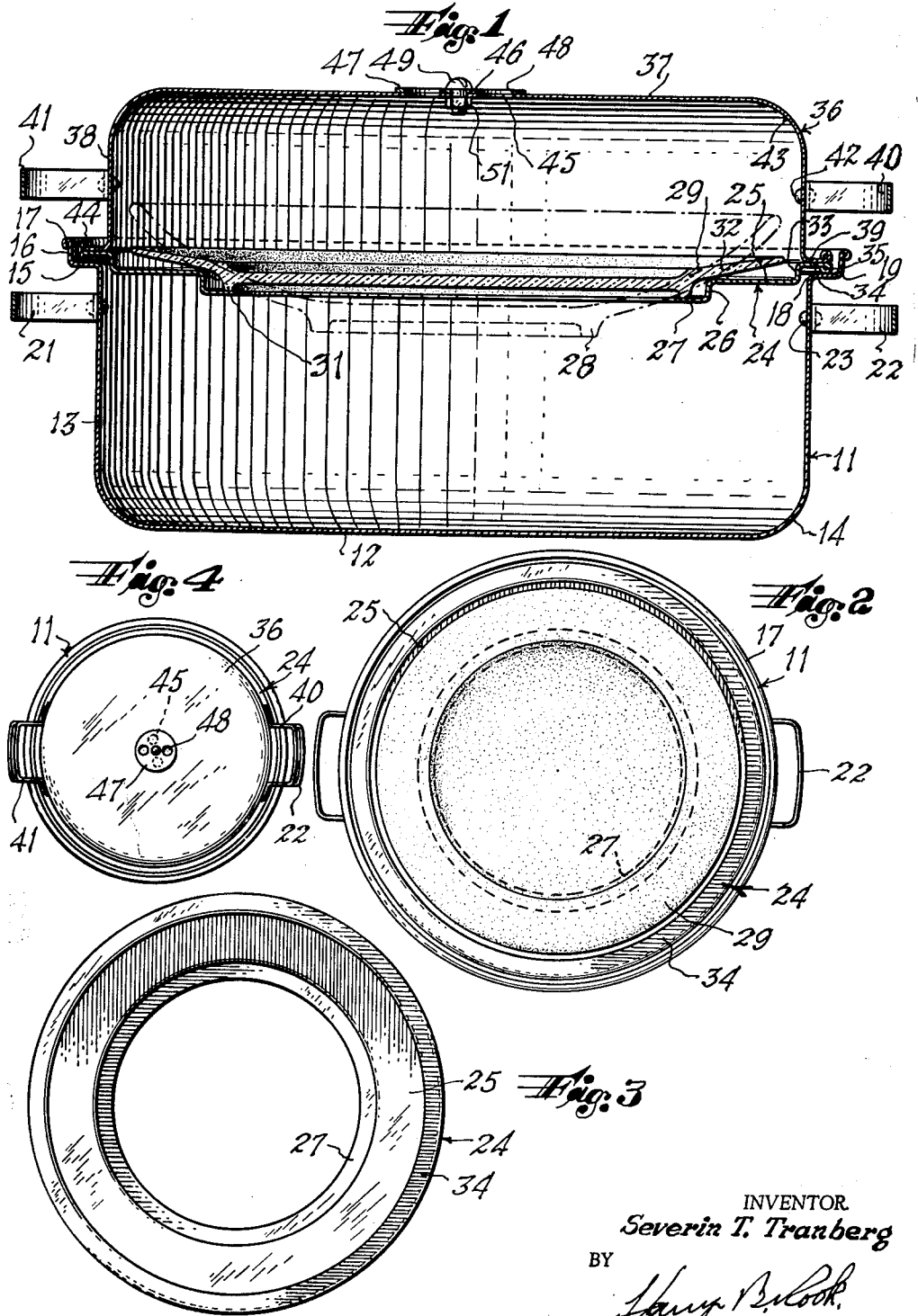

This invention relates to food warmers, and more particularly, to one consisting of a lower container or pot to hold hot water, a disc on which food-supporting plates of different sizes may be held, and a cover or hood for said disc and/or bottom portion.

Many people work odd hours or shifts and may return home long after the usual dinner hours and expect to be served a hot flavorful meal. This is an inconvenience to the housekeeper which I propose to minimize by my invention.

It is an object of my invention to provide a device in which food may be heated, or kept hot, with no possibility of burning, while avoiding the drudgery of scrubbing and washing hot, crusted, burned or stained pots.

Another object of my invention is to provide a food warmer comprising a lower container or pot adapted to hold hot water, or in which water may be heated, an annular disc supportable on the upper part of the side wall portion of said lower container, and having a central aperture to allow heat, as in the form of steam, to act directly on the bottom of a food-holding plate, wherein said plate, if relatively small may have its outer peripheral portion supported on said inner disc perpheral portion, while if larger, the bottom portion of said plate may be supported on said disc, with the peripheral plate portion extending to near the side wall of said container, and a cover for said container and disc which is supportable on the outer peripheral portion of said disc and held in place by an upstanding outer rim on the lower container.

These and other objects and advantages will become apparent from the following detailed description when taken with the accompanying drawings. It will be understood that the drawings are for purposes of illustration and do not define the scope or limits of the invention, reference being had for the latter purpose to the appended claim.

In the drawings, wherein like reference characters denote like parts in the several views:

FIGURE 1 is an axial sectional view of a food warmer embodying my invention;

FIGURE 2 is a plan, to a smaller scale, of the food warmer of FIGURE 1, after the cover has been removed;

FIGURE 3 is a plan, to the scale of FIGURE 2, of the disc portion of the food warmer separated from the associated parts; and FIGURE 4 is a plan, to a still smaller scale, of the food warmer of FIGURE 1, with the cover in place.

Referring to the drawings in detail, the illustrated embodiment of my food warmer comprises a lower container 11, desirably formed of sheet aluminum, and comprising a bottom wall 12 from the periphery of which extends or upstands a desirably cylindrical side wall 13, connecting with the bottom wall along a desirably toroidally-curved connecting portion 14. The free or upper edge of said side wall is flanged outwardly to provide a supporting annular ledge 15. The outer periphery of said ledge 15 is bounded by an upstanding narrow generally cylindrical portion 16, and free or upper edge of which is reinforced, as by being turned outwardly on itself to provide a generally toroidal portion 17. The supporting ledge portion 15 desirably connects with the side wall 13 and the rim portion 16 along curved connecting portions 18 and 19. Handles 21 and 22 are desirably provided for said lower container 11, connected to the side wall 13 thereof as by means of rivets 23.

Supported on the portion 15 of the container 11 is an annular disc member 24, also desirably formed of sheet aluminum. Said disc member comprises a relatively-wide median annular portion 25, a narrow cylindrical portion 26 depending from the inner edge of said median portion, the bottom edge of said cylindrical portion being extended inwardly as a narrow annular shelf 27. The shelf 27 is adapted to serve as a set for the peripheral portion of a plate of one type intermediate its bottom and its rim, indicated in dot-dash lines at 28, or for the bottom of a plate 29 of another type, such as the bottom annular depending and supporting base 31 thereof, and from which the sloping peripheral portion 32 of said plate extends diagonally upward and outward. The cylindrical portion 26 holds the plates against lateral slipping, or, in effect, with the shelf 27, forms a recessed support or nest for the plates.

A narrow cylindrical portion 33, upstands from the outer edge of said median portion 25, and the top edge of said upstanding portion is extended outwardly as the annular peripheral portion 34 of said disc, for support on the annular ledge 15 of said lower container 11. The outer peripheral portion of said annular peripheral portion 34 is desirably reinforced by being turned downwardly on itself, as indicated at 35, to form a generally toroidal portion which is adapted to directly engage the top surface of the ledge 15, as illustrated most clearly in FIGURE 1. By virtue of the curvatures of the connections between the portion 15 and the portions 13 and 16, the disc 24, when placed on said lower container, is guided to a desired generally centralized position with respect thereto, and prevented from any substantial deviation from such position by the upstanding rim 16 of said lower container 11.

The third member of my food warmer is a cover or hood 36 which is supportable on the peripheral portion of the disc 24 when in position as illustrated in FIGURE 1, or on the annular ledge portion 15 of the lower container if the disc is removed. This gives versatility in use of my device as, when employed with a plate bigger than that designated 29, the peripheral portion of said plate might rest directly on the ledge portion 15 without using the disc 24, and the hood 26 could then rest directly on the peripheral portion of the plate, instead of on the peripheral portion of the disc 24.

In the illustrated embodiment, the cover comprises a top wall 37 from the periphery of which depends a substantially cylindrical side wall 38. The free edge of said side wall 38 is flanged outwardly to form an annular portion 39, of a size corresponding generally with the peripheral portion of said annular disc, in order to be supportable thereon. If the disc is omitted, the annular portion 39 could directly engage and be supported on the annular ledge portion 15 of the lower container 11. Like the lower container, the cover 36 is desirably provided with a pair of handles 40 and 41 connected to its side wall 38 as by rivets 42. The side wall 38 connects with the top wall 37 along a desirably toroidally-curved connecting portion 43. The outer or peripheral edge portion of the annular portion 39 is desirably also reinforced, as by bending upwardly upon itself to provide a generally toroidal portion 44.

To avoid the development of excessive condensation of steam in the hood 36, I may provide a pair of holes 45 on either side of the center of the cover, with a smaller hole 46 therebetween. A closure member 47 for said holes is then provided, with a pair of corresponding holes 48 and pivotally connected to the top wall of said cover, as by a bolt 49 passing through the relatively small hole 46 and a corresponding central hole in the closure member 47, and a nut 51. Thus the holes 45 in the top wall 37 may be left open when the closure member 47 is moved to the position of FIGURE 1, or may be partly closed, or even entirely closed, as when it is moved to the position of FIGURE 4. An alternative, a number of small holes may be drilled in the cover, as along a diameter thereof and evenly spaced. As a further alternative, a nozzle-type steam vent protruding above the cover, similar to those used on large roasters, may be employed.

Desirable specifications for the parts of my food warmer are as follows:

*First part.*—Bottom container or pot 11 is made of light to medium gauge aluminum, 3 11/16" high, 11 3/8" in diameter at the outer rim of the top, with an inside ledge 11" in diameter, 5/16" deep from top of pot and 1/4" wide, with two aluminum strip handles centered on the outside at each end of a diameter and 5/8" down from the top or rim of the pot, each handle of aluminum strip approximately 5 1/2" long, 1/16" thick and 1/2" wide, bent and riveted to each side of the pot to afford a handling space approximately 2 1/2" long and 13/16" deep.

*Second part.*—An aluminum disc 11" in diameter, with outer edges rolled under. At 10" diameter there is a 1/4" deep step, from 10" diameter to 7" diameter there is a flat aluminum median space 1 1/2" wide, at 7" diameter there is another 1/4" deep step, and from 7" diameter to 6" diameter there is a 1/2" wide flat ledge. The center is cut out completely, leaving an empty space of 6" in diameter. In designing this aluminum disc, the two half-inch deep steps accomplish the following:

(a) Permit the use of dinner plates from 9 1/4" to 10" in diameter.

(b) Minimize the slipping of a plate, due to being recessed.

(c) Lowers plate of food, allowing more clearance so that cover will not come in contact with the food.

*Third part.*—The cover or hood of aluminum is 2" high, 11" in diameter at the outer rim, with two aluminum riveted handles 11/16" from the rim of the cover, with specifications the same as handles on the bottom container or pot.

METHOD OF USE

Portions of freshly cooked food, proportionate to the known appetite of late or absent member of family, are placed on a dinner plate, covered, and kept on counter or placed in refrigerator, depending on length of time person will be late. Have the pot with the cover and aluminum disc ready. On arriving home, a person fills the bottom portion of the pot about one-third full (or about 1 1/2 quarts) of preferably hot water, places the pot on the range, turning heat high. Place aluminum disc on inside ledge of the pot and place the plate of food on the aluminum disc. Leave the cover off until steam begins to rise; then put the cover on the pot, lowering heat to medium. Keep cover on five to ten minutes (after a lapse of five minutes, test the food for warmth) replace the cover and heat to desired warmth.

Ice cold left-overs from the refrigerator, placed in my meal warmer on high or hot flame, are hot meals in 15 to 20 minutes. Food remains hot longer, when served on my warmer, as the plate is hot when placed on the dining table. It thus keeps the hot meal warm longer than the customary cold plate the average meal is usually served on. Place the plate on a dry plate before placing on the dining table, to avoid getting the tablecloth, or other table covering, wet.

I claim:

A food warmer comprising a substantially cylindrical container comprising a bottom wall from the periphery of which extends a container side wall, the free edge portion of said side wall being flanged outwardly to form an annular ledge, the outer edge portion of said ledge being extended at an angle away from said bottom wall to form a rim, an annular food-holding disk having a central opening and a perimetral portion to removably seat on said ledge, said disk being otherwise imperforate and comprising a relatively wide median annular portion, a narrow cylindrical portion depending from the inner edge of said median portion, the bottom edge part of said cylindrical portion being extended inwardly as a narrow annular shelf that forms said opening and serves selectively as a seat for the bottom of a relatively small plate and as a seat for the intermediate portion of a larger plate between the bottom and the rim thereof, a narrow cylindrical portion upstanding from the outer edge of said median portion to limit lateral slipping of said plates on the ring, the top edge of said upstanding portion being extended outwardly as said perimetral portion of the disk for support on said annular ledge of the container, a cover for said container comprising a top wall from the periphery of which depends a cover side wall, the free edge portion of said cover side wall being of a size and shape to fit within said rim of the container and to be supported selectively on said ledge and on said perimetral portion of the food holding disk when the latter is resting on said ledge, and an adjustable vent in said cover to regulate the escape of moist air from the food warmer.

References Cited by the Examiner

UNITED STATES PATENTS

| 1,003,112 | 9/11 | Johnson | 126—377 |
| 1,178,301 | 4/16 | Curran | 126—377 |
| 1,328,001 | 1/20 | Kinsman. | |
| 1,334,930 | 3/20 | Chadwick | 126—327 |

FOREIGN PATENTS

| 127,742 | 6/18 | Great Britain. |

JAMES W. WESTHAVER, *Primary Examiner.*